United States Patent [19]

Bonney et al.

[11] 4,292,277
[45] Sep. 29, 1981

[54] LIQUID-LIQUID CONTACTING APPARATUS

[75] Inventors: Christopher F. Bonney, Yarm; George A. Rowden, Stockton-on-Tees, both of England

[73] Assignee: Davy McKee (Minerals & Metals) Limited, Stockton-on-Tees, England

[21] Appl. No.: 167,473

[22] Filed: Jul. 11, 1980

[30] Foreign Application Priority Data

Jul. 20, 1979 [GB] United Kingdom ............... 25385/79

[51] Int. Cl.³ ............................................. B01D 11/04
[52] U.S. Cl. ................................... 422/259; 210/296; 210/511; 423/8
[58] Field of Search ............... 422/258, 259, 260, 257; 209/169, 170; 210/21, 296, 511; 423/8–10

[56] References Cited

U.S. PATENT DOCUMENTS

| | | | |
|---|---|---|---|
| 2,701,753 | 2/1955 | Eisenlohr et al. | 422/258 X |
| 2,893,846 | 7/1959 | Wistrich et al. | 422/260 X |
| 3,013,866 | 12/1961 | Samaniego et al. | 422/259 X |
| 3,097,071 | 7/1963 | Lowes et al. | 422/259 X |
| 3,143,395 | 8/1964 | Milmore | 422/258 X |
| 3,549,332 | 12/1970 | Yoon | 422/259 X |
| 3,692,494 | 9/1972 | Bathellier et al. | 422/259 |
| 3,811,844 | 5/1974 | Dunmyer, Jr. et al. | 422/257 |
| 4,203,956 | 5/1980 | Schroter et al. | 422/258 X |

Primary Examiner—Richard L. Chiesa
Attorney, Agent, or Firm—Bernard & Brown

[57] ABSTRACT

A compact, multi-stage, co- or counter-current liquid-liquid extraction apparatus includes first and second mixer-settlers which share a common wall. Each of the first and second mixer-settlers comprises a mixing chamber having an agitator mounted therein, upper and lower settling chambers, and upper and lower baffles between the mixing chamber and the upper and lower settling chambers respectively. The liquid media to be contacted in each mixer-settler are supplied to the mixing chamber from which dispersion flows upwardly and downwardly into the upper and lower baffles. Disengaged lighter medium flows out from the upper settling chamber to the mixer-settler, over a weir whose length exceeds half the length of the common wall, while disengaged heavier medium flows out of the lower settling chamber of one mixer-settler to the corresponding mixing chamber of the next mixer-settler. In one form the disengaged heavier medium also overflows a corresponding outlet weir to pass on to the next mixer-settler. In another form the disengaged heavier medium passes through a pipe from the lower settling chamber of one mixer-settler leading to the mixing chamber of the next mixer-settler. In operation a 1:1 phase ratio of the dispersion in the mixing chambers can be maintained despite a different (e.g. 10:1) feed rate ratio of the liquid media to the apparatus.

10 Claims, 8 Drawing Figures

LIQUID-LIQUID CONTACTING APPARATUS

This invention relates to an apparatus for effecting liquid-liquid contact in a plurality of stages between an aqueous liquid medium and an organic hydrophobic liquid medium capable of undergoing mass transfer with the aqueous medium.

Liquid-liquid extraction, or solvent extraction as it is often termed, is a widely used process in the chemical and metallurgical industries. Conventional equipment for this purpose generally comprises one or more mixer-settlers arranged in series. In a multi-stage liquid-liquid extraction process a plurality of mixer-settlers will be connected in series; in such a process the two media may flow in co-current from one mixer-settler to the other, but more often than not the two media pass in counter-current one to another through the extraction plant.

Conventionally a mixer-settler comprises a mixer compartment to which the two media are fed and which contains an impeller designed to form a "primary dispersion" of the liquid media one within the other. In such a "primary dispersion" the globules of the dispersed phase are of a size, typically larger than about 100 micrometers in diameter, such that simply on standing under gravity the dispersion disengages into its two constituent phases. The formation of "secondary dispersions" containing smaller globules of dispersed phase, for example with a diameter of about 20 micrometers or less, is to be avoided. From the mixer compartment the dispersion passes into a separate settling compartment in which the phases are allowed to disengage and from which the disengaged phases pass on, e.g. to the next extraction stage.

In order to optimise mass transfer between the phases it is usual to select a phase ratio approaching 1:1 by volume in the mixer compartment. It is unusual to operate the mixer at phase ratios outside the range of from about 5:1 to about 1:5, and more usually the feeds of the two phases to the mixer are controlled to produce a phase ratio of about 2:1 to about 1:2 within the mixer compartment.

The nature of the extraction process may require, however, that in the overall extraction process, the feed rates of the organic hydrophobic medium to the aqueous medium differ markedly from this preferred mixing ratio of about 1:2 to about 2:1. For example, a uranium extraction plant in which a uranium sulphuric acid leach liquor is contacted in a plurality of stages in counter-current with an organic extractant (e.g. a 5% by volume "Alamine 336" solution in kerosene/2.5% by volume isodecanol), may require the feed rates to be in the ratio aqueous:organic of 10:1 by volume. In order to achieve a 1:1 ratio by volume in the mixer of each stage it is necessary to recycle coalesced organic phase to the mixer compartment by means of an external loop in the ratio of 9 volumes of recycled organic phase for every 10 volumes of aqueous feed solution supplied. Hence 20 volumes of dispersion are produced for every 10 volumes of aqueous feed solution supplied and the organic phase must undergo recycle many times. This requires significant energy consumption to effect the necessary recycle of organic phase.

In the settler three layers are formed, i.e. an upper disengaged organic layer, a middle dispersion band and a lower disengaged aqueous layer. For a given settling area there is a limiting rate at which dispersion can be fed to the settler, above which rate the dispersion band depth increases until eventually, the settler becomes flooded with dispersion. Since the rate of disengagement of the phases of the dispersion in the settling compartment is limited by the settler area, the plan area of the settler compartment must be sufficiently large to permit disengagement of 20 volumes of dispersion for every 10 volumes of aqueous sulphuric acid leach liquor supplied in order to prevent flooding of the settler with dispersion. This means that the inventory of organic phase must be correspondingly large and that there is considerable hold up of uranium in the settlers of the plant. Furthermore the settler tanks must be large and must be constructed on site. The cost of the settler tanks and the cost of the solvent inventory both constitute significant factors in terms of erection and capital costs of the plant. Also the large surface areas of the settlers represent a considerable fire hazard. The cost of providing fire prevention equipment is also a significant factor in many parts of the world.

In copending patent application Ser. No. 063089 filed Aug. 2, 1979 by Edward Gavin and assigned to the assignee of the present application there is described a form of multi-stage, co- or counter-current liquid-liquid extraction apparatus having two or more stages, each of which lies adjacent at least one other stage and comprises a mixing chamber having an agitator mounted therein, upper and lower settling chambers, and upper and lower baffles between the mixing chamber and the upper and lower settling chambers respectively. The liquid media to be contacted in each stage are supplied to the mixing chamber from which dispersion flows upwardly and downwardly into the upper and lower baffles. Disengaged lighter medium flows out from the upper settling chamber over a weir to the next stage, whilst disengaged heavier medium flows out of the lower settling chamber of one stage to the mixing chamber of the next stage. In one illustrated form of apparatus the disengaged heavier medium passes up a riser and overflows a corresponding weir to pass on to the next stage. In another illustrated embodiment the disengaged heavier medium passes under an underflow weir and thence to the mixing chamber of the next stage. It is further described how in operation of the apparatus a 1:1 phase ratio of the dispersion can be maintained in the mixing chambers of the individual mixer-settlers despite a different (e.g. 10:1) feed rate ratio of the liquid media to the apparatus.

It is a feature of each of the forms of apparatus illustrated in the aforesaid Gavin application that there are vertical partitions at the corners of each mixer-settler which strengthen the structure and divide off preferably triangular compartments which act as downcomers or risers as appropriate for the liquid media. In each case the weir in the path of the disengaged lighter medium from one mixer-settler to the next is formed within one of these triangular compartments.

Such structures are effective both over a range of liquid flow rates at a constant feed rate ratio of the liquid media supplied to the apparatus and also over a range of different feed rate ratios of the liquid media supplied to the apparatus. However, it has been found that when operating for example at a high aqueous:organic feed rate ratio (the organic phase being lighter than the aqueous phase in this case) it is necessary to operate at relatively high impeller tip speeds in order to generate the necessary hydraulic head to cause the liquid media to flow through the apparatus. This means that the shear rate in the vicinity of the impeller is correspondingly high which tends to give rise to smaller droplet sizes of the dispersed phase. Such smaller droplet sizes in turn mean that the time required for disengagement of the dispersion increases. In extreme cases this can lead to flooding of the upper and/or lower settling chamber with dispersion and carryover of dispersion from one stage to the next. In addition it has been found that when operating under such conditions it becomes extremely difficult to balance the hydraulic pressures within the mixing chamber and hence to control the phase ratio of the dispersion, particularly if the feed rate ratio of the liquid media to the apparatus changes during operation, e.g. as a result of variations in the rate of supply of aqueous medium to the apparatus.

There is therefore a need to improve the design of apparatus of the type described in the aforesaid Gavin application, more particularly to develop a design of apparatus in which the above-mentioned drawbacks are obviated or minimised.

The present invention accordingly seeks to provide an improved form of multi-stage, co- or counter-current liquid-liquid extraction apparatus. It also seeks to provide a design of apparatus which obviates or minimises the drawbacks to the apparatus of the aforesaid Gavin application.

According to the present invention there is provided apparatus for effecting liquid-liquid contact in a plurality of stages between an aqueous liquid medium and an organic hydrophobic liquid medium capable of undergoing mass transfer with the aqueous liquid medium, comprising:
a first mixer-settler;
a second mixer-settler adjacent the first mixer-settler;
  each mixer-settler comprising:
  a mixing chamber;
  agitator means in the mixing chamber for mixing the aqueous and organic hydrophobic liquid media so as to form a dispersion of globules of one medium dispersed in the other, which globules are of a size such that, upon standing under gravity, the dispersion is capable of disengaging substantially completely into two separate layers;
  an upper settling chamber above the mixing chamber;
  a lower settling chamber below the mixing chamber; and
  upper and lower baffle means extending across the mixer-settler so as to divide the mixing chamber from the upper settling chamber and the lower settling chamber respectively, each baffle means being adapted to provide a plurality of flow paths for liquid between the mixing chamber and the respective settling chamber and to permit maintenance in the respective settling chamber of conditions favouring dispersion disengagement despite turbulent mixing conditions in the mixing chamber;
means for supplying the heavier medium of the two to the mixing chamber of the first mixer-settler;
means for removing disengaged heavier medium from the lower settling chamber of the second mixer-settler;
means for supplying the lighter medium of the two to the mixing chamber of one of the first and second mixer-settlers;
means for removing disengaged lighter medium from the upper settling chamber of the other one of the first and second mixer settlers;
weir means in the flow path of lighter medium between the first and second mixer-settlers and having a length which exceeds half the length of the common wall, over which weir means disengaged lighter medium from the upper settling chamber of the said one mixer-settler may overflow;
first conduit means for passing disengaged lighter medium that overflows the weir means from the said one mixer-settler to the mixing chamber of the said other mixer-settler; and
second conduit means for passing disengaged heavier medium from the lower settling chamber of the first mixer-settler to the mixing chamber of the second mixer-settler.

In the apparatus of the invention the weir means exceeds half the length of the common wall and is preferably as long as practicable whilst remaining consistent with the requirement that the apparatus be relatively compact. Typically the weir means is at least 0.6 times and preferably 0.75 times the length of the common wall. In a preferred form of apparatus the weir means extends substantially along the entire length of the common wall.

The second conduit means may comprise a riser connected to a weir box containing an outlet weir means for heavier medium, over which the disengaged heavier medium from the first mixer-settler may overflow, and conduit means for receiving the heavier medium that overflows the outlet weir means for heavier medium communicating with the mixing chamber of the second mixer-settler; alternatively it may comprise conduit means, preferably provided with flow control means (e.g. a valve) therein, that provides direct connection between the lower settling chamber of the first mixer-settler and the mixing chamber of the second mixer-settler.

When the apparatus is intended for counter-current flow between stages, the said one mixer-settler is the second mixer-settler and the said other mixer-settler corresponds to the first mixer-setter. For co-current flow the said one mixer-settler is the first mixer-settler and the said other mixer-settler corresponds to the second mixer-settler.

In use of the apparatus the organic hydrophobic medium may be lighter or heavier than the aqueous medium. In a typical multi-stage uranium extraction plant, for example, the organic extractant (e.g. a 5% by volume solution of "Alamine 336" in kerosene/2.5% by volume iso-decanol) will normally be the lighter phase. However, in other form of multi-stage extraction plant, the organic hydrophobic medium may be the heavier medium, particularly if the organic medium contains a solvent, such as chloroform, which has a specific gravity greater than 1.

The liquid media are preferably supplied to the mixing chamber of each mixer-settler through concentric draught tubes.

A preferred form of apparatus according to the invention comprises an elongate tank housing substantially rectangular in plan, said housing comprising a floor, a pair of elongate side walls and a pair of end walls, and said housing is further internally divided by at least one transverse internal wall extending upwardly from said floor and between said side walls so as to form at least two box sections in said housing, each said box section corresponding to a corresponding mixer-settler. Such box sections are preferably square in plan. In such a construction the or each transverse internal wall forms a common wall between an adjacent pair of mixer-settlers.

The means for removing disengaged heavier medium from the lower settling chamber of the second mixer-settler and/or the second conduit means for passing disengaged heavier medium from the lower settling chamber of the first mixer-settler to the mixing chamber of the second mixer-settler may comprise an outlet weir means for heavier medium; such an outlet weir means may be aligned parallel to a wall of the corresponding mixer-settler other than the or a common wall. When the apparatus comprises a tank housing of the above-mentioned type, such other wall comprises part of one of the side walls of the tank housing. Preferably the outlet weir means for heavier medium has a length which exceeds half the length of the common wall (e.g. at least 0.6 times and preferably at least 0.75 times the length of the common wall) and conveniently is of a length corresponding substantially to the corresponding length of the side wall of the respective mixer-settler. The apparatus of the aforesaid Gavin application has a weir in each mixer-settler over which such disengaged lighter medium must flow in order to pass from one mixer-settler to the next. Hence as the flow rate of lighter medium through the apparatus increases so the crest height of the liquid overflowing the weir must increase. Because the maximum length of this weir is restricted to the length of one of the shorter sides of the corresponding triangular compartments formed by the vertical partitions at the corners of the adjacent mixer-settlers, an increase in flow rate of the lighter medium through the apparatus leads to a corresponding increase in the crest height over this weir. It is found in practice that even quite small variations in crest height over this weir (e.g. variations of as little as 1 inch or so) have a profound effect on the position of the settled interface between the liquid media (i.e. the interface formed when the liquid media are flowing but the impeller is stopped) and hence on the instantaneous volume ratio of the media in the mixing chamber and the phase ratio of the dispersion. This variation in flow rate ratio of the media can cause considerable operating difficulties in the case of the Gavin apparatus and can result in an undesirable reduction in the rate and efficiency of mass transfer due to departure of the dispersion phase ratio from the desired ratio. By adopting a design in which the width of the weir for the disengaged lighter medium is not limited by the position of any vertical partition, the apparatus of the present invention is rendered significantly less critically dependent on the relative or absolute flow rates of the media to the apparatus because the much broader weir means provided for the disengaged lighter medium ensures that the variations in crest height with variations in flow rate are correspondingly reduced, which in turn leads to a much improved degree of control over the settled interface position and hence over the phase ratio in the dispersion.

In order that the invention may be clearly understood and readily carried into effect some preferred embodiments thereof will now be described, by way of example only, with reference to the accompanying drawings, wherein.

Figure 1:
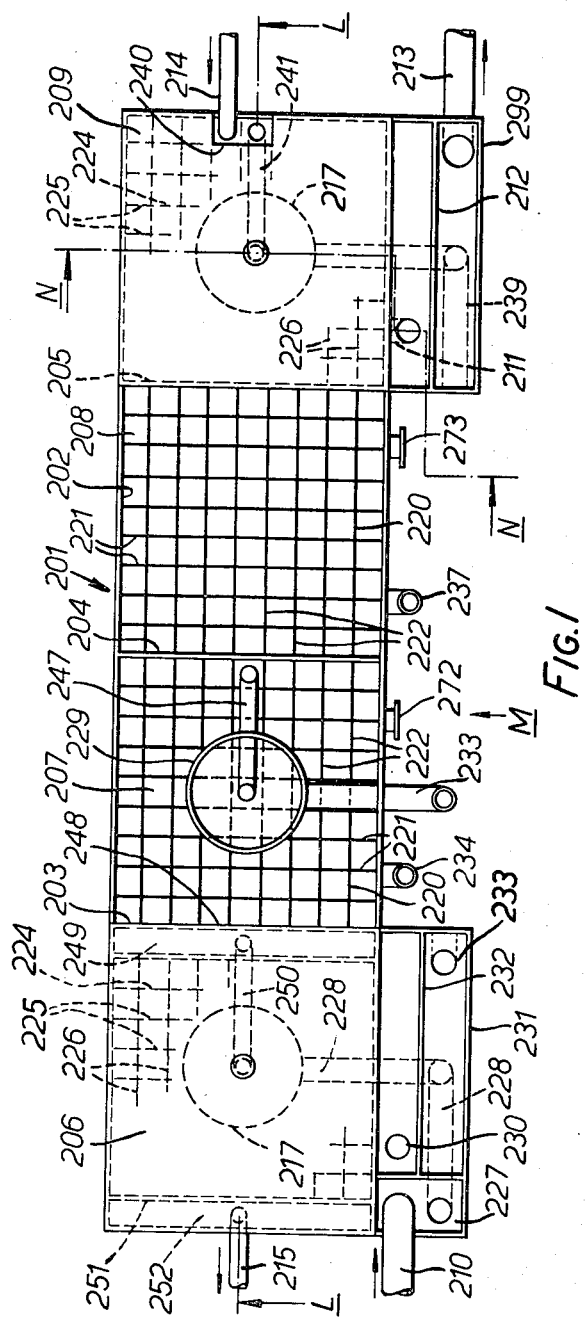
FIG. 1 is a view from above, partly in plan and partly in horizontal section, taken at different levels in different parts of the plant, of a uranium solvent extraction plant (with its top cover removed), which comprises four extraction stages and is constructed according to the invention, this view being taken on the line K—K of FIG. 2.

Referring to FIGS. 1 to 4 of the drawings, a uranium solvent extraction plant 201 comprises a tank 202 that is generally rectangular in plan, which is divided internally by three transverse walls 203, 204, 205 so as to provide four separate mixer-settler sections each comprising one of the four extraction stages 206, 207, 208, 209. A pregnant uranium leach liquor (e.g. a sulphuric acid leach solution) is supplied to the first extraction stage 206 by means of inlet pipe 210 and flows in turn through the four extraction stages 206, 207, 208, 209. An aqueous raffinate is withdrawn from fourth extraction stage 209 through offtake 211 and overflows weir 212 of weir box 299 to exit the plant 201 via outlet pipe 213. An organic extractant (e.g. a 5% by volume "Alamine 336" solution in kerosene/2.5% by volume iso-decanol) is supplied to plant 201 through inlet pipe 214 at approximately one tenth the rate of supply of the aqueous uranium leach liquor through inlet 210. This extractant passes in counter-current to the aqueous stream through the four extraction stages in the order 209, 208, 207, 206 and the loaded extractant exits plant 201 via offtake pipe 215.

Each of the four extraction stages 206, 207, 208 and 209 is constructed as a mixer-settler and is similar in construction to the other extraction stages. Each has a mixing chamber 216 with an impeller 217 mounted therein on a vertical shaft 218. A motor (not shown) is provided on top of each extraction stage for driving the respective shaft 218 through suitable reduction gearing (not shown).

Beneath mixing chamber 216 in each extraction stage is a lower settling chamber 219; this is separated from mixing chamber 216 by means of a lower baffle 220 which extends horizontally across the extraction stage. As can be seen from FIG. 1, baffle 220 is of the "egg box" type and consists of two sets of plates 221, 222 secured to one another at right angles. Above mixing chamber 216 is an upper settling chamber 223 which is separated therefrom by means of an upper baffle 224 generally similar in construction to that of lower baffle 220. As with lower baffle 220, upper baffle 224 comprises two sets of parallel plates 225, 226 secured at right angles to one another. Baffles 220 and 224 serve to provide a plurality of pathways for liquid between the mixing chamber 216 and the respective settling chamber 219 or 223. The spacing between adjacent plates of the baffles 220 and 224 and the depth of these baffles are such that they serve to eliminate from liquid entering the respective settling chamber 219 or 223 from mixing chamber 216, most, if not all, of the rotational movement about the axis of shaft 218 produced by impeller 217. In this way liquid enters the settling chambers 219 and 223 in a substantially vertical direction and conditions conducive to disengagement of the phases are established in the settling chambers 219 and 223 despite turbulent mixing conditions in the adjacent mixing chamber 216.

Inlet pipe 210 for the pregnant uranium leach liquor empties into a feeder box 227 to which is connected a pipe 228. Pipe 228 leads in turn to an open-topped distributor drum 229 mounted below impeller 217. Aqueous liquor leaves lower settling chamber 219 of first extraction stage 206 through a riser 230 and passes into a weir box 231 mounted on the side of first extraction stage 206, overflows a weir 232 (which is similar to weir 212 shown in FIG. 4), and exits weir box 231 through a pipe 233 which leads to the distribution drum 229 of second extraction stage 207. Aqueous liquor leaves the lower settling chamber 219 of second extraction stage 207 through pipe 234 and passes to a weir box 235, which is similar to, but somewhat longer than, weir box 231 and is fitted with a weir (not shown) similar to weirs 212 and 232. It then overflows the weir of weir box 235 and passes through pipe 236 to the distributor drum 229 of third extraction stage 208. In a similar way aqueous liquor from lower settling chamber 219 of third extraction stage 208 passes through pipe 237 to weir box 238 (which is identical to the weir box 235 and the weir box 299 of the fourth extraction stage 209), overflows the weir of weir box 238, and passes via pipe 239 to the distributor drum 229 of the fourth extraction stage 209. From fourth extraction stage 209 the raffinate is withdrawn from the corresponding lower settling chamber 219 by means of offtake pipe 211, weir 212 and outlet pipe 213 as already described.

Figure 2:
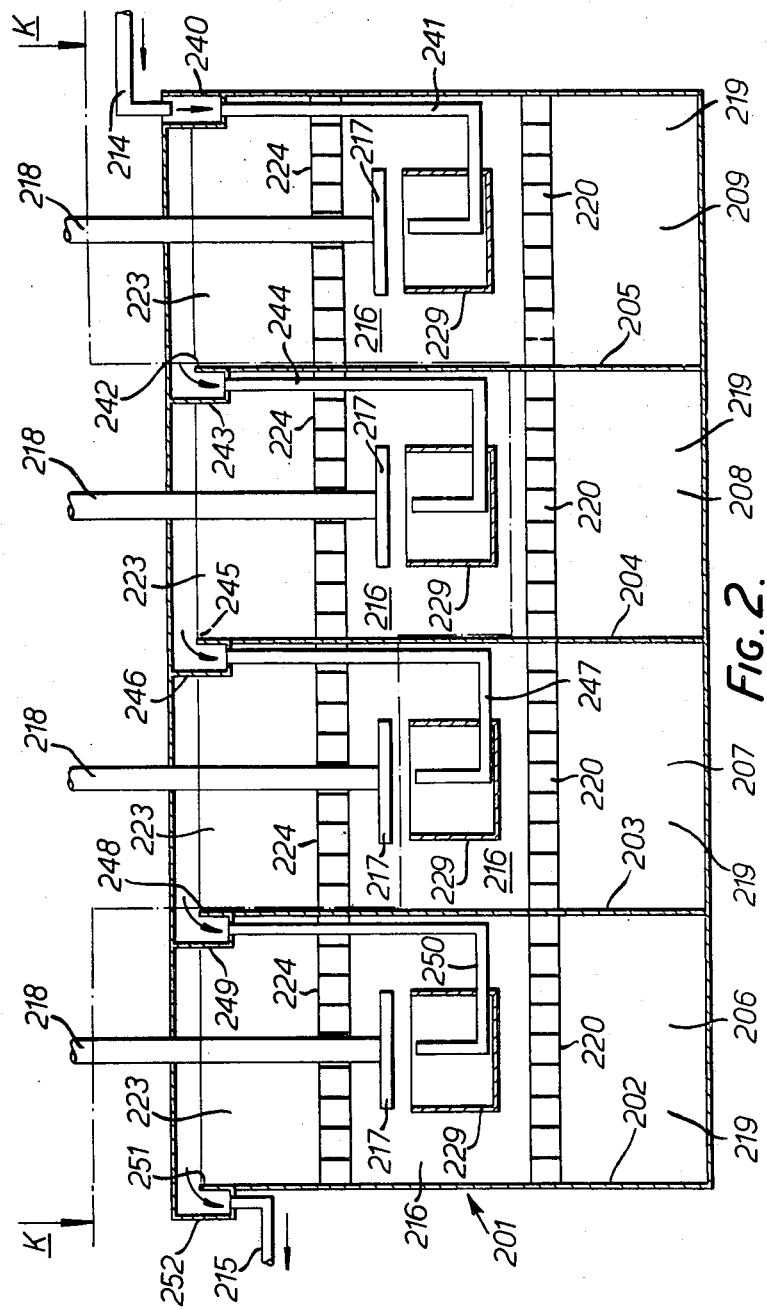
FIG. 2 is a vertical section of the plant of FIG. 1, taken on the line L—L of FIG. 1.

The lean organic liquor enters the plant 201 through line 214 which empties into a feeder box 240; from here the organic liquor passes down tube 241 and is sucked up into the eye of the impeller 217 of the fourth extraction stage (see FIG. 2). From upper settling chamber 223 of fourth extraction stage 209 organic liquor can overflow a weir 242 to a feeder box 243 which extends across the width of the third extraction stage 208 and which supplies a tube 244. In a similar way organic liquor can overflow over a weir 245 from third extraction stage 208 to a feeder box 246 extending across the width of second extraction stage 207 which supplies a tube 247 leading to the eye of the corresponding impeller 217. Again, organic liquor can overflow from second extraction stage 207 over a weir 248 to a feeder box 249. As with feeder boxes 243 and 246 and weirs 242 and 245, weir 248 and feeder box 249 each extend the full width of the plant 201. From feeder box 249 the organic liquor passes on through tube 250. Finally, loaded organic liquor exits the upper settling chamber 223 of the first extraction stage 206 by overflowing weir 251 to collection box 252, both of which extend the full width of the plant. From collection box 252 the loaded organic liquor flows out of the plant 201 through outlet pipe 215.

In operation of the plant, pregnant uranium leach liquor enters first extraction stage 206 through inlet 210 and passes via feeder box 227, pipe 228 and distributor drum 229 into the "eye" of impeller 217 in mixing chamber 216. Organic phase enters feeder box 249 of first extraction stage 206 by passage over the weir 248, passes down through the tube 250 and into the "eye" of impeller 217. Impeller 217 serves to disperse the phases one in the other so as to form a so-called "primary dispersion", that is to say a dispersion of globules of one phase in the other of a size such that, on standing under gravity, substantially complete disengagement of the phases occurs. Typically such globules are at least about 100 micrometers in diameter. The presence of "secondary dispersion"-sized globules, i.e. globules which will not disengage on standing under gravity, is to be avoided. "Secondary dispersion"-sized globules are usually about 20 micrometers in diameter or less.

Dispersion passes through baffles 220 and 224 both downwardly and upwardly from mixing chamber 216. Disengagement of the phases occurs in the baffles and/or in the settling chambers 219 and 223. Disengaged heavier phase (i.e. aqueous phase) flows back from baffle 224 into mixing chamber 216, whilst disengaged lighter phase (i.e. kerosene phase) flows back from baffle 220 into mixing chamber 216.

Disengaged kerosene phase collects in upper settling chamber 219 and flows out over weir 251 into collection box 252 and thence to outlet pipe 215. Disengaged aqueous phase collects in lower settling chamber 219 and passes through pipe 230 into weir box 231, over the weir 232 and then through pipe 233 into the distributor drum 229 of second extraction stage 107.

In second extraction stage 207 the aqueous phase is drawn into the "eye" of impeller 217. The organic phase overflows from third extraction stage 208 over weir 245 into feeder box 246, and flows down tube 247 and thence through distributor drum 229 to the impeller 217. Dispersion formation and disengagement takes place as described above in relation to first extraction stage 206. Disengaged organic phase from upper chamber 223 overflows weir 248 into feeder box 249. Disengaged aqueous phase exits lower chamber 219 via pipe 234 to pass on to third extraction stage 107 by way of weir box 235 and pipe 236.

The flow pattern through third extraction stage 208 is similar to that in second extraction stage 207.

In fourth extraction stage 209 the organic phase enters feeder box 240 via inlet pipe 214. Disengaged aqueous phase (raffinate) exits lower chamber 219 via offtake 211, weir box 299 and outlet pipe 213. Otherwise the flow paths of the aqueous and organic phases are as described for the earlier extraction stages.

If the impellers 217 are stopped, but feed of the liquors is continued, a clear settled interface between the phases will be established within each of the extraction stages. The height of this settled interface in each stage will be determined by the relative heights of the weirs over which the phases overflow to leave that stage, as well as by the densities of the phases. This interface lies in the mixing chamber 216 and its height therein essentially determines the instantaneous volume ratio of the phases in the mixing chamber 216 during operation of the plant 201 under design flow conditions, whatever the feed rate ratio of the phases thereto may be. This instantaneous volume ratio of the phases substantially corresponds to the phase ratio of the dispersion formed. For optimum operation of the plant 201 this phase ratio should be chosen so as to promote mass transfer between the phases. Preferably the phase ratio lies in the range of from about 1:5 to about 5:1 by volume. Usually it will be preferred to operate at a phase ratio of from about 2:1 to about 1:2, e.g. at about 1:1, by volume since this ratio favours mass transfer and minimises the risk of formation of a "secondary dispersion". It is preferred that the impeller 217 is positioned at about the level of the static interface between the phases.

Figure 6:
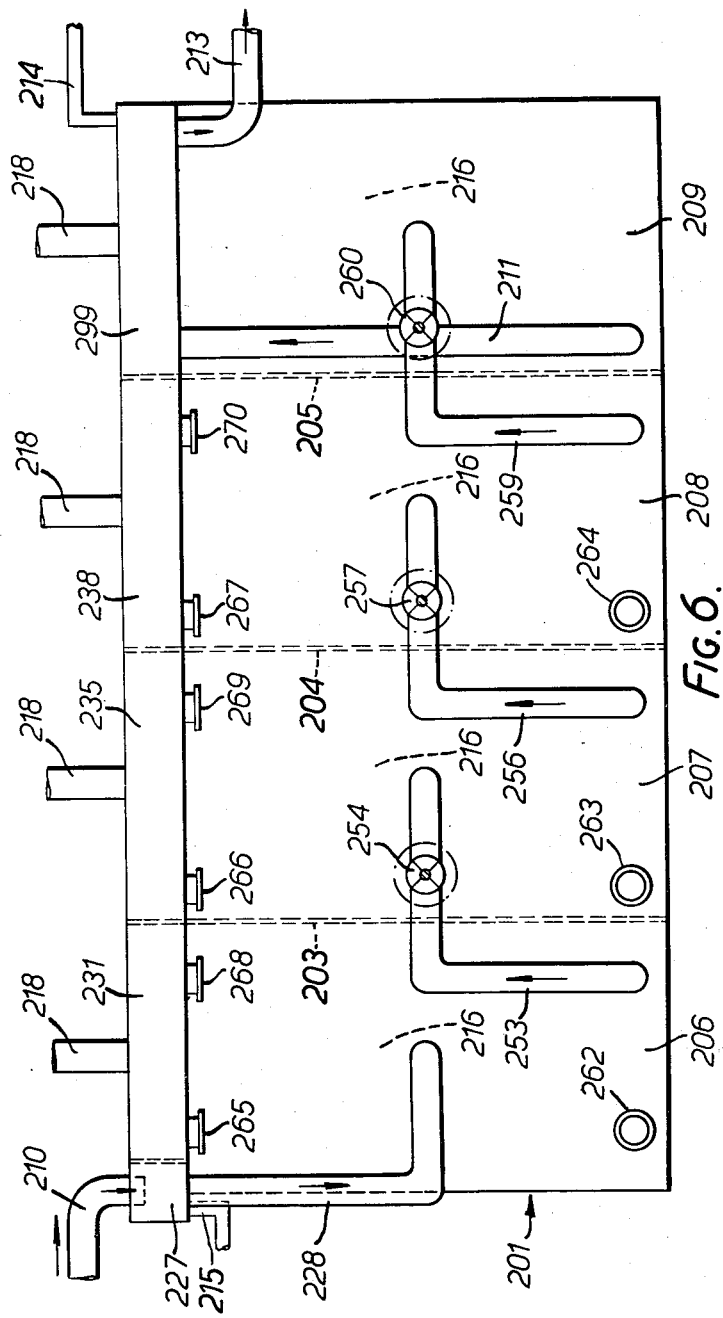
FIG. 6 is a side view of the plant of FIG. 5 seen in the direction of the arrow O of FIG. 5.
Figure 7:
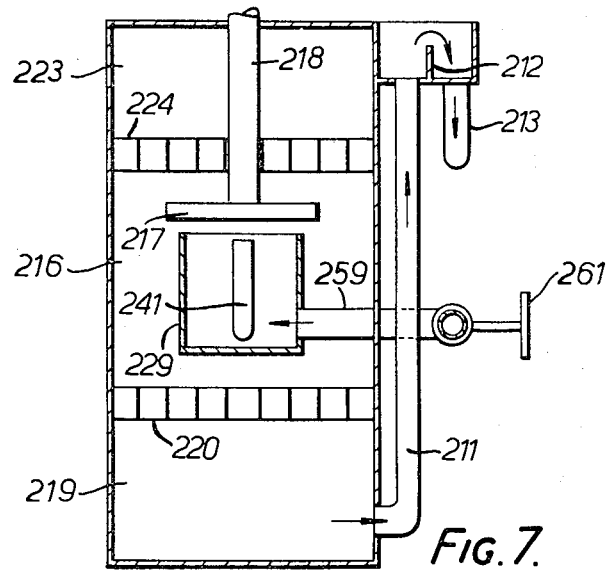
FIG. 7 is a section on the line P—P of FIG. 5.
Figure 8:
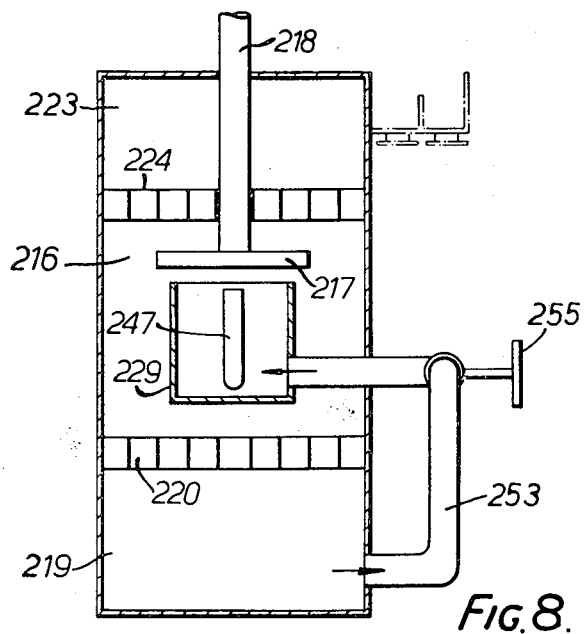
FIG. 8 is a section on the line Q—Q of FIG. 5.

The plant of FIGS. 5 to 8 is similar to that of FIGS. 1 to 4, except that the aqueous liquor passes directly between the stages and the weir boxes 231, 235 and 238 are not used. In FIGS. 1 to 8 the same reference numerals have been used to designate like parts in the two embodiments. Except where noted below the two forms of apparatus are otherwise essentially identical. In the modified plant of FIGS. 5 to 8 pipes 230 and 233 are replaced by pipe 253 which is fitted with an adjustable valve 254 operable by means of a handwheel 255. (For the sake of clarity handwheel 255 and the other handwheels to be described below are omitted from FIG. 6). In a similar fashion pipes 234 and 236 of the plant of FIGS. 1 to 4 are replaced by pipe 256 which is fitted with an adjustable valve 257 having a handwheel 258. Likewise pipes 237 and 239 are replaced by pipe 259 in which is located valve 260 having handwheel 261. Each of pipes 253, 256 and 259 leads from the lower settling chamber 219 of one stage to the corresponding distributor drum 229 of the next stage. In the plant of FIGS. 5 to 8 the flanged outlets 262, 263 and 264 which, in the plant of FIGS. 1 to 4 serve for connection of the pipes 230, 234 and 237 respectively are blanked off. Also visible in FIG. 6 are the flanged connections 265, 266 and 267 for the upper ends of pipes 230, 234 and 237 respectively and the flanged connections 268, 269 and 270 for the upper ends of pipes 233, 236 and 239 respectively of the plant of FIGS. 1 to 4.

Figure 3:
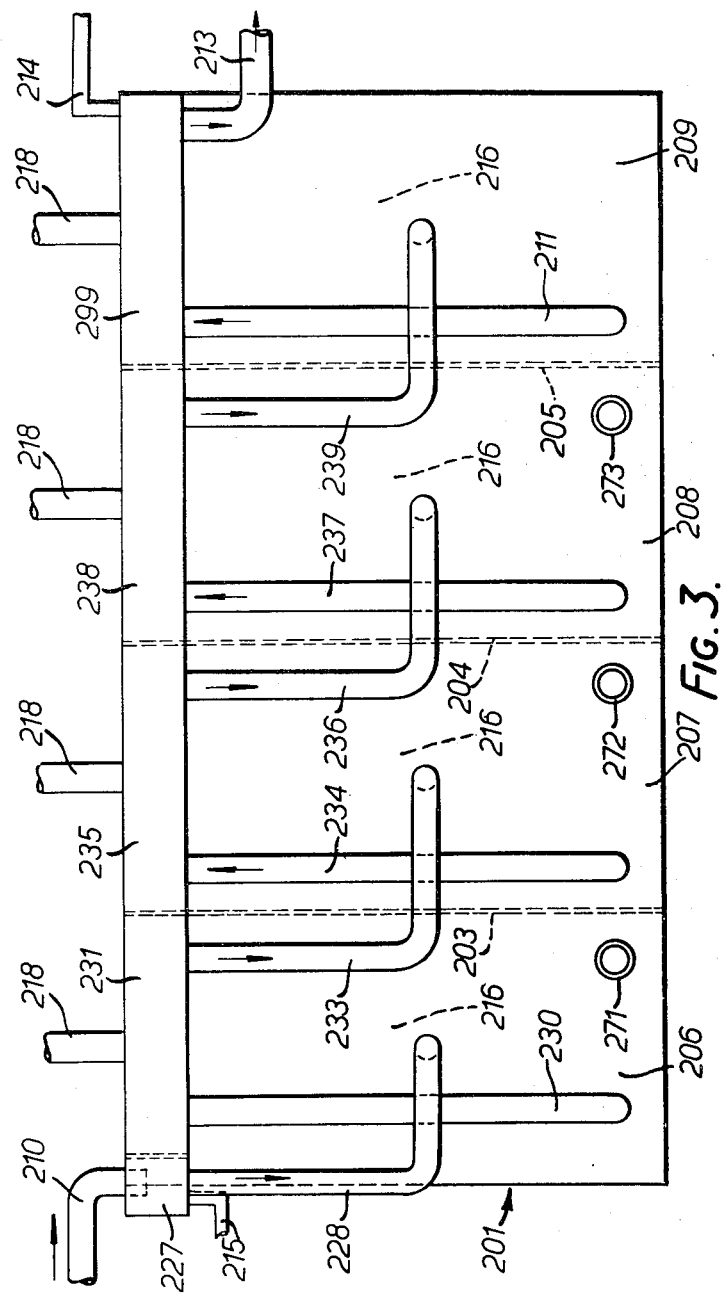
FIG. 3 is a side view of the plant of FIGS. 1 and 2 seen in the direction of the arrow M of FIG. 1.
Figure 4:
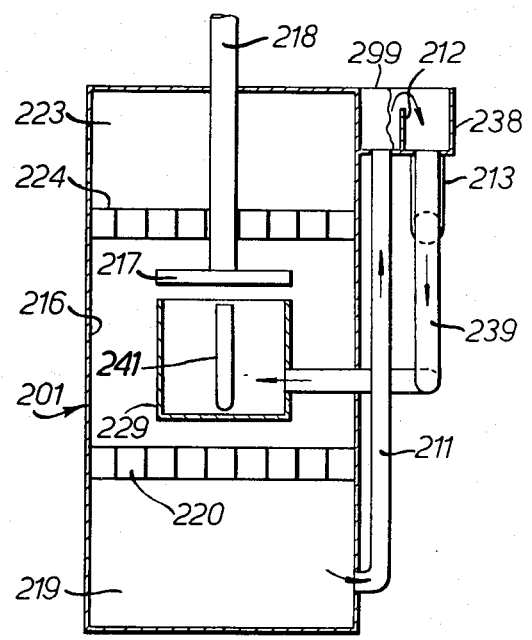
FIG. 4 is a section on the line N—N of FIG. 1.
Figure 5:
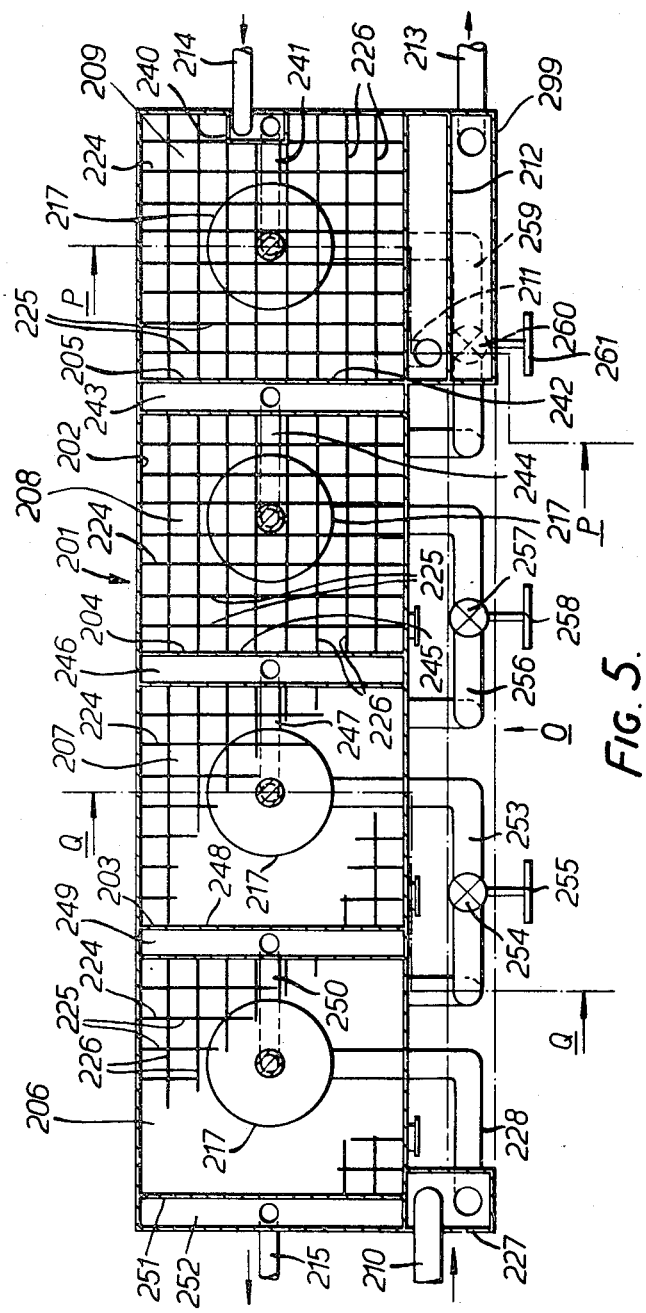
FIG. 5 is a corresponding view to that of FIG. 1 of a modified form of the plant of FIGS. 1 to 4.

In FIGS. 1 and 3 reference numerals 271, 273 and 273 represent blanked off flanged connections for the ends of pipes 253, 256 and 259 respectively of the plant of FIGS. 5 to 8.

In the plant of FIGS. 5 to 8, the valves 254, 257 and 260 serve to control the hydraulic pressure drop along the pipes in which they are fitted, i.e. the pipes 253, 256 and 259 respectively. In this way the valves 254, 257 and 260 can be used to control the position of the settled interface between the phases and hence the phase ratio of the dispersion.

The plants of FIGS. 1 to 4 and 5 to 8 are designed for counter-current flow of the two media between phases. They can be modified for co-current flow by maintaining the aqueous liquor flow path as shown and by providing a "mirror image" flow path for the organic liquor so that the organic inlet 214 and feeder box 240 are positioned at the left-hand end (as illustrated in FIG. 1) of first extraction stage 206 and the organic outlet pipe 215 and collection box 252 are positioned at the right-hand end of fourth extraction stage 209, with the corresponding intermediate tubes 241, 244, 247 and 250, weirs 242, 245, 248 and 251 and feeder boxes 243, 246 and 249 each appearing in a "mirror image" position.

In view of the comparative length of the weirs in the plants of FIGS. 1 to 4 and 5 to 8, the impellers 217 can be run at a comparatively low tip speed since it is not necessary to develop a large hydraulic head in order to cause the media to flow from one mixer-settler to the next.

In the illustrated embodiments, the various weirs are shown fixed. It will usually be preferred, however, to make these weirs adjustable, i.e. by providing vertically adjustable plates whose upper edges form the respective weirs. V-notches may be provided, if desired, in these weirs for better flow control.

Similarly the illustrated "egg box" type baffles can be replaced by other forms of baffle, e.g. inclined plates or coalescer pads such as pads of "D.C. KnitMesh" (the word "KnitMesh" is a trade mark of KnitMesh Limited of Clements House, Station Approach,. South Croydon, CR2 OYY; "D.C. KnitMesh" is a dual filament knitted mesh fabric knitted from side-by-side filaments of, for example, stainless steel and polypropylene.)

In each of the illustrated embodiments the various stages of the plant may be operated so that the dispersion is of the organic-in-aqueous (O/A) type or of the aqueous-in-organic (A/O) type. Some of the stages may be operated with one type of dispersion and some with the other or they may all be operated so that the same type of dispersion is formed in each. Usually it will be preferred to operate such stage under conditions such that the dispersed medium is the one supplied at the lower feed rate to that stage, i.e. in the case illustrated with an O/A-type dispersion in each stage. The reason for this will be discussed in more detail below.

In use of each of the illustrated forms of plant for uranium extraction the pregnant aqueous sulphuric acid leach liquor is supplied at a greater rate than the organic extractant. Typically the aqueous:organic feed rate ratio is about 10:1 by volume. The instantaneous volume ratio of the phases in the mixing chambers (and hence the phase ratio of the dispersion) is, however, adjusted to be 1:1 by volume. A 1:1 by volume ratio dispersion thus flows both upwardly and downwardly into the upper and lower baffles. Thus, at a 10:1 by volume aqueous:organic feed ratio, for every 10 volumes of aqueous leach liquor supplied to the mixing chamber, 20 volumes of dispersion flow downward into the lower baffle, whilst 1 volume of organic extractant is supplied to the mixing chamber and 2 volumes of dispersion pass into the upper baffle. Of the 20 volumes of dispersion flowing into the lower baffle, 10 volumes of aqueous liquor disengage whilst 10 volumes of organic extractant, either wholly or partially disengaged, return to the mixing chamber. By operating under aqueous continuous conditions, i.e. with an O/A type dispersion in the mixing chamber, it is not necessary that the dispersed organic extractant should disengage completely before flowing back up into the mixing chamber from the lower baffle. Hence the organic extractant may return to the mixing chamber from the lower baffle still in droplet form, albeit as somewhat enlarged droplets. Of the 2 volumes of O/A type dispersion flowing into the upper baffle, 1 volume of organic extractant is coalesced completely whilst 1 volume of aqueous liquor flows back into the mixing chamber. Hence it is not necessary that the cross-sectional area of the lower baffle and the lower settling chamber provide sufficient settling area for complete disengagement of the 20 volumes of dispersion flowing into the lower baffle. Complete disengagement is only necessary for the dispersion flowing into the upper baffle. This means that the settler area can be greatly reduced compared with that of a conventional mixer settler operating at a 10:1 by volume aqueous:organic ratio and a 1:1 by volume mixing ratio with external recycle of organic extractant.

In effect the mixer-settler stages of the illustrated forms of apparatus each incorporate an automatic internal recycle of organic extractant (or whichever phase happens to be the one supplied at the lower rate). Besides requiring a smaller settling area than conventional apparatus (and hence potentially lower inventories of organic solvent and extractant chemical and potentially less hold-up of valuable materials in the plant) there is no need for an external recycle loop.

Although a 10:1 aqueous:organic feed rate ratio to the plants has been mentioned above, the relative flow rates of the two phases to the mixing chambers can be adjusted as desired within the design limits of the plant. Thus the flow rate ratio of the phases to the mixing chamber may very within wide limits e.g. from about 100:1 or more to about 1:100 or less. Usually it will be preferred to operate at an aqueous phase:organic phase feed rate ratio of about 1:5 to about 40:1, e.g. about 10:1.

Although each of the illustrated forms of plant has been described as having four separate drive motors, i.e. one for each impeller drive shaft, it is possible to replace these four motors with a single motor driving a common horizontal drive shaft linked to the individual drive shafts through appropriate gearing. If four separate motors are used, it is advisable, in the event that one motor fails, to arrange for the remaining three motors to cut out automatically. By utilising a single motor and a common drive shaft, no such automatic shut down facility is required. If the motor fails all four impellers stop simultaneously. It is preferable also to arrange that, in the event of a drive motor failure, the feed pumps for the media to the apparatus shall cut out automatically.

At start-up, in order to ensure that a dispersion of the correct type is formed in each stage, the height of the settled interface may be temporarily adjusted upwardly or downwardly (e.g. by temporarily interrupting the flow of one phase and/or by syphoning out some of the other phase) until the impeller lies in the chosen continuous medium. Upon starting the impeller a dispersion of the correct type will be formed and this same type of dispersion will continue to be formed after the feed rates of the phases have been returned to the design rates and the phase ratio in the mixing chamber is at the design figure.

The impellers may be of any suitable design, for example of the pump-mix type, of the marine impeller type, or of the turbine type. The impeller and its rate of rotation should be so selected that shear conditions are produced in the mixing chamber conducive to formation of a "primary dispersion" and preferably so that substantially all the mixing chamber is filled with dispersion. Besides uranium extraction, the illustrated forms of plant can be used for any other suitable form of liquid-liquid extraction. Furthermore the plant is not restricted to the particular form of uranium extractant mentioned; any other conventional uranium extractant may be used. As examples of other liquid-liquid extraction processes there can be mentioned extraction of other metals from suitable leach liquors (e.g. extraction of copper from a pregnant aqueous, sulphuric acid-containing copper leach liquor with an organic extractant, such as a kerosene solution of Lix 64N or Acorga P5100). Moreover, although the illustrated forms of plant each include four mixer-settlers, it will be appreciated that the invention may equally well be practiced with two, three or five or more mixer-settlers.

It will be appreciated by those skilled in the art that in operation of each of the illustrated forms of plant, assuming that the weirs are set to produce, for example, a 1:1 aqueous:organic mixing ratio in each of the mixing chambers and that the aqueous and organic flow rates are within the design limits of the plant, this mixing ratio will be maintained automatically whatever the feed rate ratio of the media to the plant. Thus, even if the aqueous:organic feed rate ratio varies from 100:1 to 1:100, yet still the chosen mixing ratio of 1:1 will be maintained in the mixing chamber. It will be seen therefore that the system is self-balancing.

What is claimed is:

1. Apparatus for effecting liquid-liquid contact in a plurality of stages between an aqueous liquid medium and an organic hydrophobic liquid medium capable of undergoing mass transfer with the aqueous liquid medium, comprising:

a first mixer-settler;
a second mixer-settler adjacent the first mixer-settler and sharing a common wall therewith;
each mixer-settler comprising:
a mixing chamber;
agitator means in the mixing chamber for mixing the aqueous and organic hydrophobic liquid media so as to form a dispersion of globules of one medium dispersed in the other, which globules are of a size such that, upon standing under gravity, the dispersion is capable of disengaging substantially completely into two separate layers;
an upper settling chamber above the mixing chamber;
a lower settling chamber below the mixing chamber; and
upper and lower baffle means extending across the mixer-settler so as to divide the mixing chamber from the upper settling chamber and the lower settling chamber respectively, each baffle means being adapted to provide a plurality of flow paths for liquid between the mixing chamber and the respective settling chamber and to permit maintenance in the respective settling chamber of conditions favouring dispersion disengagement despite turbulent mixing conditions in the mixing chamber;
means for supplying the heavier medium of the two to the mixing chamber of the first mixer-settler;
means for removing disengaged heavier medium from the lower settling chamber of the second mixer-settler;
means for supplying the lighter medium of the two to the mixing chamber of one of the first and second mixer-settlers;
means for removing disengaged lighter medium from the upper settling chamber of the other one of the first and second mixer-settlers;
weir means in the flow path of lighter medium between the first and second mixer-settlers and having a length which exceeds half the length of the common wall, over which weir means disengaged lighter medium from the upper settling chamber of the said one mixer-settler may overflow;
first conduit means for passing disengaged lighter medium that overflows the weir means from the said one mixer-settler to the mixing chamber of the said other mixer-settler; and
second conduit means for passing disengaged heavier medium from the lower settling chamber of the first mixer-settler to the mixing chamber of the second mixer-settler.

2. Apparatus according to claim 1, in which the weir means extends substantially along the entire length of the common wall.

3. Apparatus according to claim 1, in which the second conduit means comprises a riser connected to a weir box containing an outlet weir means for heavier medium, over which the disengaged heavier medium from the first mixer-settler may overflow, and conduit means for receiving the heavier medium that overflows the outlet weir means for heavier medium communicating with the mixing chamber of the second mixer-settler.

4. Apparatus according to claim 1, in which the second conduit means comprises a conduit means that provides a direct connection between the lower settling chamber of the first mixer-settler and the mixing chamber of the second mixer-settler.

5. Apparatus according to claim 4, in which the said conduit means is provided with flow control means therein.

6. Apparatus according to claim 1 and adapted for counter-current flow between stages, in which the said one mixer-settler is the second mixer-settler and the said other mixer-settler corresponds to the first mixer-settler.

7. Apparatus according to claim 1, and adapted for co-current flow between stages, in which the said one mixer-settler is the first mixer-settler and the said other mixer-settler corresponds to the second mixer-settler.

8. Apparatus according to claim 1, comprising an elongate tank housing substantially rectangular in plan, said housing comprising a floor, a pair of elongate side walls and a pair of end walls, and said housing being further internally divided by at least one transverse internal wall extending upwardly from said floor and between said side walls so as to form at least two box sections in said housing, each said box section corresponding to a corresponding mixer-settler.

9. Apparatus according to claim 8, in which the box sections are square in plan.

10. Apparatus according to claim 1, in which at least one means selected from (a) the means for removing disengaged heavier medium from the lower settling chamber of the second mixer-settler and (b) the second conduit means for passing disengaged heavier medium from the lower settling chamber of the first mixer-settler to the mxing chamber of the second mixer-settler comprises an outlet weir means for heavier medium aligned parallel to a wall of the corresponding mixer-settler other than the or a common wall.

* * * * *

UNITED STATES PATENT AND TRADEMARK OFFICE
CERTIFICATE OF CORRECTION

PATENT NO. : 4,292,277
DATED : September 29, 1981
INVENTOR(S) : Bonney et al.

It is certified that error appears in the above—identified patent and that said Letters Patent is hereby corrected as shown below:

Column 6, line 28, "iso" should be underlined;

Column 8, line 8, "and-" should be --and--;

Column 9, line 25, the figure "273" (first occurrence) should be --272--;

Column 10, line 8, "such" should be --each--;

line 68, "very" should be --vary--;

Column 14, line 14, "mxing" should be --mixing--.

Signed and Sealed this

Ninth Day of March 1982

[SEAL]

Attest:

GERALD J. MOSSINGHOFF

Attesting Officer   Commissioner of Patents and Trademarks